INVENTORS:
JOHN W. PALM
ROSCOE F. VANDAVEER

INVENTORS:
JOHN W. PALM
ROSCOE F. VANDAVEER

United States Patent Office 3,477,810
Patented Nov. 11, 1969

3,477,810
SULFUR DEW POINT MEASUREMENT AND APPARATUS THEREFOR
John W. Palm and Roscoe F. Vandaveer, Tulsa, Okla., assignors to Pan American Petroleum Corporation, Tulsa, Okla., a corporation of Delaware
Filed Oct. 9, 1967, Ser. No. 673,668
Int. Cl. C01b *17/06*
U.S. Cl. 23—225                                        5 Claims

ABSTRACT OF THE DISCLOSURE

This invention provides a method and apparatus for maintaining the feed gas to a catalytic sulfur recovery unit near the sulfur dew point. The latter may be periodically or continuously measured by means of a device of novel design employing two temperature sensing means, one of which is entirely enclosed and out of contact with the flowing gases, whereas the temperature sensing portion of the other is in contact with the feed gas and is positioned a short distance below the body of the device. When sulfur dew point conditions are reached liquid sulfur bridges across from the bottom of the device to the end portion of the exterior temperature sensing means causing a sharp drop in recorded temperature denoting the sulfur dew point.

---

This invention relates to the manufacture of sulfur from hydrogen sulfide-containing gases. More particularly, it concerns novel means for controlling the feed gas temperatures to improve the yield of recovered sulfur.

Background of the invention

In the recovery of sulfur from hydrogen sulfide-containing gases by means of the modified Claus process, the gas containing hydrogen sulfide is introduced into a furnace along with sufficient air to convert about one third of the hydrogen sulfide to sulfur dioxide. While in the furnace, a substantial portion of the sulfur dioxide reacts with hydrogen sulfide to form free sulfur and water. Because of equilibrium considerations, it is desirable to remove these products from the furnace effluent before the latter is fed into the catalytic reactor so that conditions for the reaction of hydrogen sulfide with sulfur dioxide will be more favorable. Accordingly, the furnace effluent is usually run through a waste heat boiler to convert the produced sulfur to liquid form and then the liquid product is separated from the uncondensed gas to be used as feed. This gas, however, after it comes from the waste heat boiler is at a temperature of about 350° F., whereas the temperature of the feed to the catalytic reactor should normally be from about 425° F. to about 450° F. To bring the 350° F. feed gas up to the desired reactor inlet temperature, one of the principal methods of pre-heating this cooler stream is to bypass a portion of the furnace effluent—usually at a temperature of about 1000° F.— around the waste heat boiler and mix enough of it with the 350° F. stream to bring the temperature of the latter up to a value within the aforesaid temperature range of 425° F. to 450° F. In pre-heating the feed in this way, however, the free sulfur present in the hot bypass gas is introduced into the reactor feed.

While the use of hot bypass gas to pre-heat the reactor feed is in many respects a practical and convenient way to effect such step, it, of course, has the disadvantage of putting back free sulfur and water into the feed stream, thus tending to render conditions in the catalytic reactor less favorable for completion of the reaction between hydrogen sulfide and sulfur dioxide. Also, unless the temperature, composition and volume of the bypass re-heat stream are carefully monitored, conditions within the reactor can easily change from optimum to undesirable without the operator realizing it. Thus, although it is known that best conversion of hydrogen sulfide to free sulfur is obtained when the feed gas temperature is slightly above the sulfur dew point, the use of bypass re-heating methods as now practiced, results in feed gas temperatures substantially above the sulfur dew point. This tends to prevent the desired reaction from proceeding to completion. Also, it is, of course, possible to operate at or slightly below the sulfur dew point of the feed gas, in which case, the free sulfur precipitates onto the surface of the catalyst causing the latter to decrease in or lose its activity. In such instances, the plant may have to be shut down and the catalyst regenerated by the use of superheated steam to drive off the deposited sulfur.

Brief description of the invention

We have now invented a method and apparatus designated to overcome the problems created by the use of bypass re-heating. These improvements enable us to maintain the feed stream to a catalytic reactor at a substantially constant temperature differential, which typically may be from 5° to 25° F., above the sulfur dew point of said stream. This is accomplished by the use of a system which takes advantage of the fact that liquid sulfur has a higher thermal conductivity than that of the reactor feed gas, thus making possible rapid, reliable dew point determination of sulfur-bearing gases. In one embodiment of our invention, a device having two temperature sensing instruments, such as thermocouples, is placed in the feed gas line just upstream of the reactor, or it can be placed inside the reactor at most any location at which the feed gas will contact it before the gas contacts the catalyst. The first thermocouple is cooled slowly. When sulfur condenses, the liquid bridges across the tip of the device to the second thermocouple which lowers its temperature, signifying that the first thermocouple is at the sulfur dew point. In carrying out our invention the proper feed gas temperature that will result in maximum sulfur recovery is first determined. During this determination the sulfur dew point of the feed gas is measured, noting the difference in sulfur dew point and feed gas temperature at which maximum sulfur recovery is obtained. Thereafter, the sulfur dew point is periodically measured and the feed gas temperature is adjusted, as required, to maintain a substantially constant difference between the sulfur dew point and the feed gas temperature. This latter temperature difference should be essentially the same as it was when maximum sulfur recovery was obtained.

Brief description of the drawings

Our invention will be further described by reference to the following drawings in which.

Figure 1:
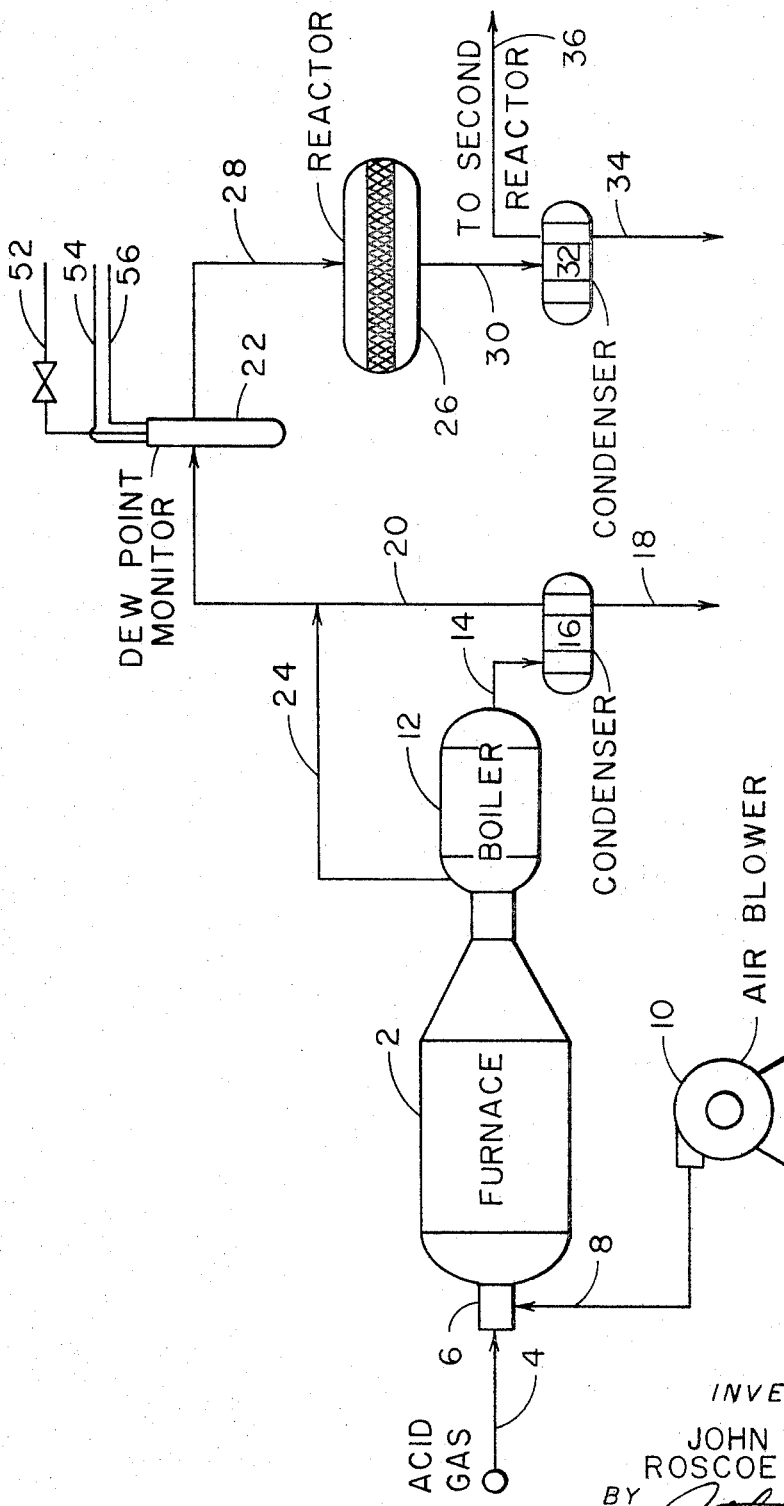
FIGURE 1 shows a typical modified Claus plant employing one catalytic reactor having our devices inserted in the feed line a short distance upstream thereof.

Referring again to FIGURE 1, an acid gas feed, such as that taken from a conventional gas sweetening system, is introduced into furnace 2 via line 4 and burner 6. Stoichiometric air is added to the furnace through line 8 by means of blower 10. In the furnace, a portion of the hydrogen sulfide is converted to sulfur dioxide at a temperature in the neighborhood of 2500° F. Also, some of the sulfur dioxide thus produced reacts with the hydrogen sulfide to form free sulfur. The quantity of sulfur thus produced oftentimes represents from 40 percent to 60 percent of the total recoverable sulfur. Gases containing hydrogen sulfide, sulfur dioxide and free sulfur are discharged from furnace 2 into boiler 12, cooled to about 500° F. and conducted therefrom through line 14 into condenser 16, where the sulfur produced in the furnace is converted into a liquid and removed therefrom through line 18. The uncondensed gas phase, which is at a temperature, for example, from about 325° to 375° F., is taken off the top of condenser 16 through line 20, leading to our dew point monitor 22. shown schematically, but illustrated in greater detail in FIGURE 2. Since the feed gas coming from condenser 16 is substantially below optimum temperature for the desired reaction, it is preheated by mixing with sufficient 1000° F. gas in line 24 that has been bypassed around boiler 12, to bring the temperature of the resulting mixture up to about 430° to 440° F. As previously pointed out, such mixture contains free sulfur vapors and water which can interfere to a substantial extent with satisfactory operation of catalytic reactor 26. The sulfur dew point of the mixture cannot be calculated because changes in furnace efficiency influence of the sulfur content of the stream in line 24 and changes in condenser efficiency affect the sulfur content of the stream in line 20. However, by monitoring the sulfur dew point of the feed gas mixture contacting monitor 22, the temperature of the stream going into reactor 26 via line 28 can be maintained substantially at the optimum temperature level for maximum sulfur recovery. The hot reaction products are withdrawn from reactor 26 through line 30 and sent to condenser 32 where liquid product sulfur is withdrawn through line 34 and the uncondensed gases, if enough hydrogen sulfide and sulfur dioxide remain therein, are sent eventually to a second reactor through line 36. If the concentration of hydrogen sulfide and sulfur dioxide in line 36 is insufficient to warrant a second reactor, they may be sent to a suitable incinerator, burned, and the combustion products discharged into the atmosphere.

Figure 2:
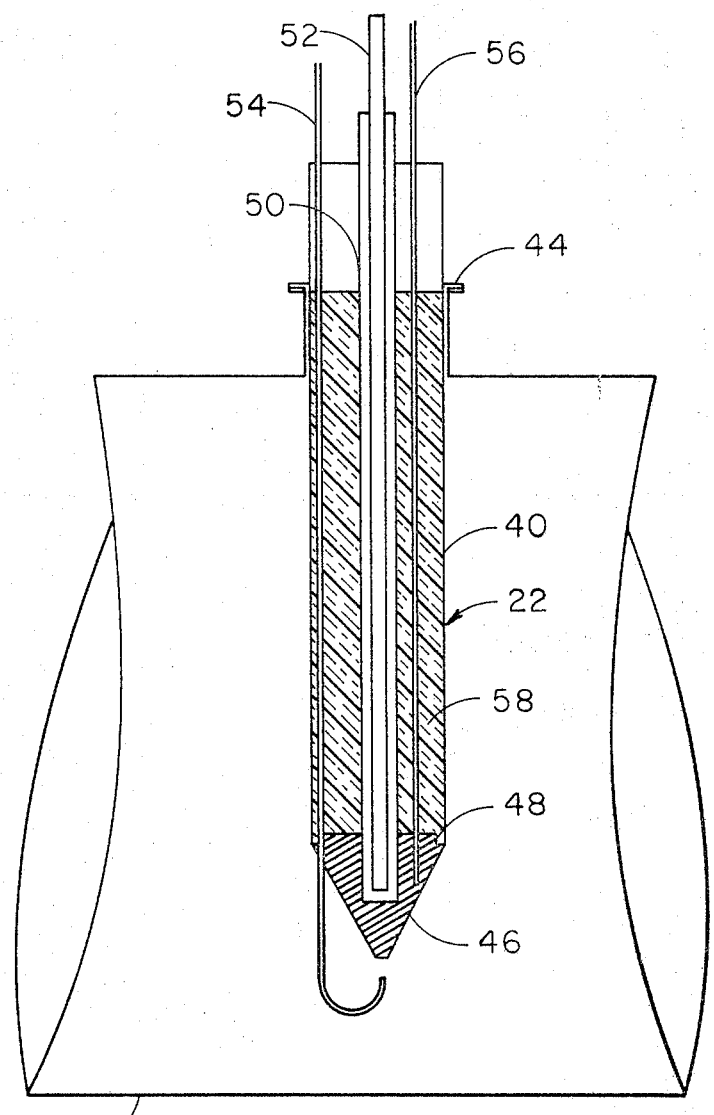
FIGURE 2 is a fragmentary view illustrating details of our sulfur dew point monitor.

The probe-like instrument, shown in detail in FIGURE 2, and generally as 22 in FIGURE 1, comprises a long cylindrical member or case 40, extending into conduit 42 and held in place by means of flanged support 44. The top of case 40 may or may not be closed; however, in order to keep dust, corrosive gases, etc., out of it we generally prefer to keep it covered. Nose or cone 46 is affixed to the lower end of case 40 by means of threads 48. Centrally of case 40 and running substantially the entire length thereof is steel tube 50 secured into a recessed portion of cone 46 by means of silver solder (not shown). Within tube 50 is a second tube 52, which serves to conduct cooling air down into the instrument and back up the walls of tube 50. On either side of tube 50 are thermocouples 54 and 56. Thermocouple 56 terminates in cone 46 while thermocouple 54 runs on through and ends in a J shape with the tip of the J directly under the tip of cone 46. The gap between cone 46 and the J-shaped thermocouple, where liquid sulfur forms under sulfur dew point conditions, may vary considerably. However, for the majority of purposes, this distance preferably should be from about $\frac{1}{16}''$ to about $\frac{1}{4}''$.

The instrument may be constructed of stainless steel, aluminum, or the like. The dimensions of the different components may also vary. However, in the work we carried out, the apparatus had an over-all length of six inches and was $1\frac{3}{16}''$ I.D. Tubes 50 and 52 were $\frac{1}{4}''$ and $\frac{1}{8}''$ O.D., respectively, while thermocouples 54 and 56 each had a diameter of $\frac{1}{16}''$.

The two thermocouples are connected to a dual channel temperature recorder (not shown). Thermocouple 56, embedded in cone 46, indicates the temperature at that point, i.e., the temperature of cooled cone 46 and from this the temperature at which the liquid sulfur starts to condense can be determined. Thermocouple 54 shows a sudden temperature drop when liquid sulfur flows from the base of cone 46 down onto the end of thermocouple 54 forming a liquid sulfur bridge connecting these two points. The liquid sulfur bridge then breaks and flows on down to the lower part of the J-shaped portion of thermocouple 54, at which time it again indicates the gas stream temperature. The open space inside case 40 is filled with glass wool insulation 58 or other suitable material. This aids in keeping the air stream in tube 52 as cool as possible which, in turn, enables the operator to maintain the temperature of metal cone 46 at a substantially lower level than the stream contacting the exterior of it—a condition which promotes more effective condensation of the sulfur.

Figure 3:
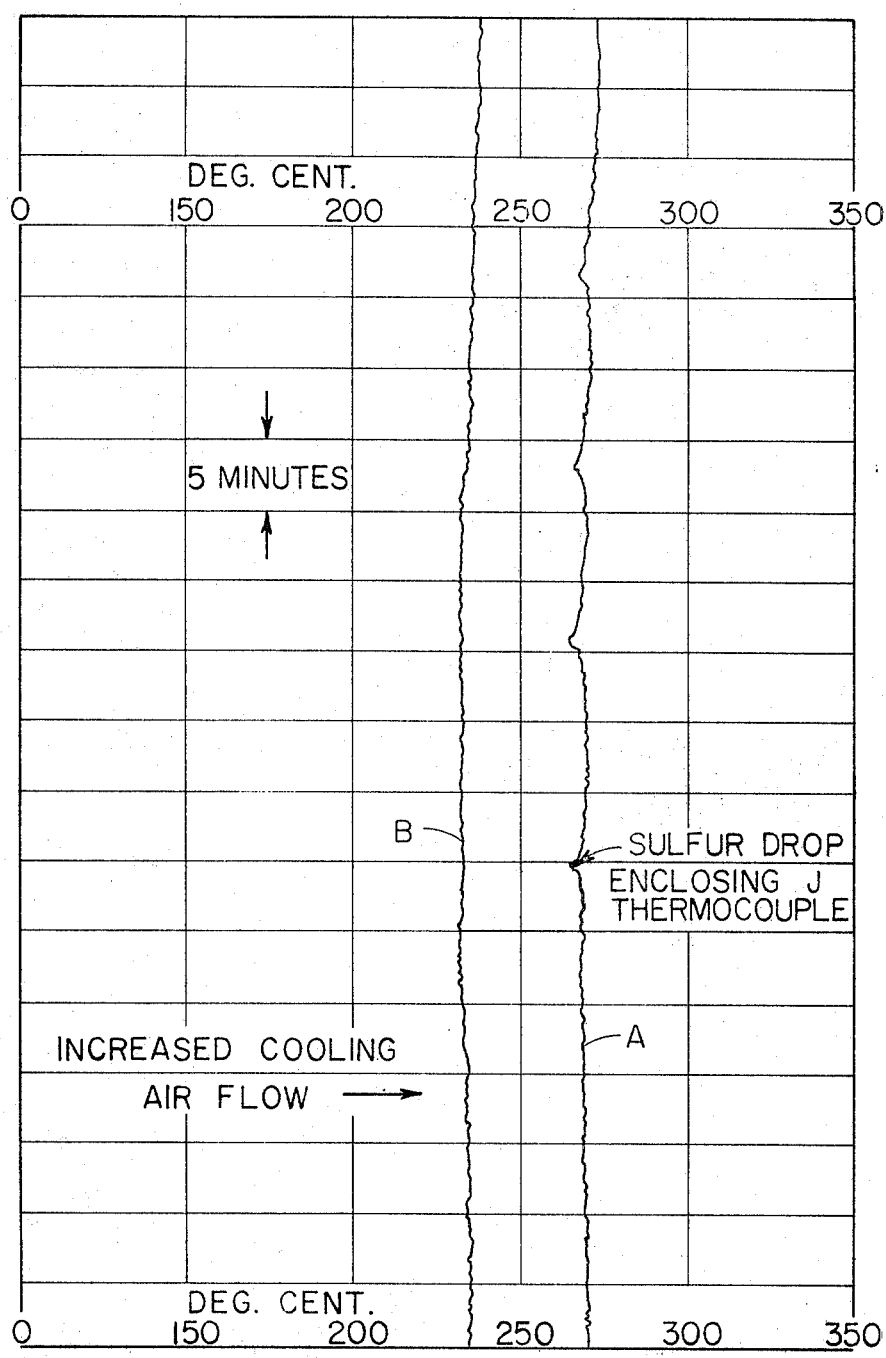
FIGURE 3 is a temperature chart made while determining the dew point of a sulfur-bearing gas by the use of the apparatus of our invention.

FIGURE 3 represents a section of a temperature chart made while measuring the sulfur dew point of a gaseous stream containing sulfur vapors. Curve A is the record made by thermocouple 54. It will be seen that the change is very sharp when a drop of liquid sulfur bridges across the tip of cone 46 to the tip of thermocouple 54. This fact was verified visually through a sight glass placed in the line in which our device was inserted. Also, it will be noted in Curve A that distinct "pips" appear on the curve denoting the fact that a drop of liquid sulfur has bridged across from the tip of cone 46 to the end of thermocouple 54 and because of the relatively high thermal conductivity of the liquid sulfur, a temporary slight but distinct temperature reduction is produced. Curve B is the record made by thermocouple 56. It will be seen that a temperature change of only 2° C. (3.6° F.) causes the sulfur to start condensing on the tip of cone 46.

In operation, the two thermocouples sense values very near the gas stream temperature when no sulfur condensation is occurring. Cooling air is then introduced down and out the end of tube 52 into larger tube 50. This cools the lower end of the instrument, creating more favorable conditions for condensation of sulfur. The air rate is gradually increased until sulfur condensation on cone 46 occurs as evidenced by sudden, periodic temperature drops registered by thermocouple 54. The flow of cooling air is then decreased slowly until no more liquid sulfur is formed. By varying the temperature several times above and below the dew point, the latter can be bracketed within a few degrees F.

It is important to be able to measure the sulfur dew point periodically or continuously because uncontrolled variables influence the furnace and condenser efficiency mentioned above. These uncontrolled variables include ambient temperature, temperatures of the acid gas and air, changes in the hydrogen sulfide and hydrocarbon content of the acid gas, the acid gas feed rate, burner efficiency, and the condition of the cooling tubes.

In one instance, the principle of our invention was used in a sulfur recovery plant having a daily capacity of about 585 long tons and by closer regulation of the feed gas temperature to a level just above the sulfur dew point, a gross increase in revenue of about $500 per day was realized. Our invention is likewise useful in analyzing a stream for the sulfur content thereof. Measuring the sulfur content of the reactor feed gas or other streams aids in evaluating the performance of the furnace, condenser, separator, etc., thus making it possible to improve plant design.

We claim:

1. In a method for producing free sulfur in a catalytic reaction zone from a gaseous stream containing sulfur vapor, hydrogen sulfide and sulfur dioxide, the improvement which comprises monitoring the sulfur dew point of said stream, and thereafter maintaining a temperature difference between said dew point and said feed mixture such that the temperature rise across said zone is a maximum.

2. In a method for producing sulfur from a hydrogen sulfide-containing gas by reaction of a portion of hydrogen sulfide therein with oxygen to produce free sulfur and sulfur dioxide, cooling the major portion of the resulting hot stream containing sulfur, sulfur dioxide, and hydrogen sulfide to a temperature sufficient to condense out the sulfur therein in liquid form, and re-heating the resulting sulfur denuded stream by mixing the latter with a minor portion of said hot stream to produce a feed mixture having a temperature suitable for the reaction of hydrogen sulfide with sulfur dioxide in a catalytic reaction zone to produce free sulfur, the improvement which comprises continuously measuring the sulfur dew point of said feed mixture, and thereafter maintaining a temperature difference between said dew point and said feed mixture such that the temperature rise across said zone is a maximum.

3. In a method for producing sulfur from a hydrogen sulfide-containing gas by reaction of a portion of hydrogen sulfide therein with oxygen to produce free sulfur and sulfur dioxide, cooling the major portion of the resulting hot stream containing sulfur, sulfur dioxide, and hydrogen sulfide to a temperature sufficient to condense out the sulfur therein in liquid form, and re-heating the resulting sulfur denuded stream by mixing the latter with a minor portion of said hot stream to produce a feed mixture having a temperature suitable for the reaction of hydrogen sulfide with sulfur dioxide in a catalytic reaction zone to produce free sulfur, the improvement which comprises reducing the temperature of said feed mixture until a first temperature differential between said mixture and the effluent from said zone passes through a maximum while determining the sulfur dew point of said feed mixture, thereafter monitoring said sulfur dew point, and adjusting the temperature of said feed mixture as required to maintain a second temperature differential between said sulfur dew point and said feed mixture substantially equivalent to that prevailing when said first temperature differential was established.

4. The method of claims 1 or 2 wherein said temperature difference ranges from about 5 to about 25° F.

5. The method of claim 3 wherein said second temperature differential ranges from about 5 to about 25° F.

References Cited

UNITED STATES PATENTS

| 2,200,928 | 5/1940 | Lindblad et al. | 23—225 |
| 2,494,628 | 1/1950 | Oberding | 23—288 X |
| 2,758,913 | 8/1956 | Pearce | 23—225 |

FOREIGN PATENTS 867,853   5/1961   Great Britain.

OSCAR R. VERTIZ, Primary Examiner

G. O. PETERS, Assistant Examiner

U.S. Cl. X.R.

23—253, 288; 73—17